(12) United States Patent
Hicks et al.

(10) Patent No.: US 7,848,973 B2
(45) Date of Patent: Dec. 7, 2010

(54) METHOD, SYSTEM, AND PROGRAM PRODUCT FOR DEMOGRAPHIC REPORTING OF BILLABLE PROJECT ACTIVITY

(75) Inventors: Scott D. Hicks, Underhill Center, VT (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 11/179,399

(22) Filed: Jul. 12, 2005

(65) Prior Publication Data
US 2007/0025532 A1 Feb. 1, 2007

(51) Int. Cl.
*G07F 19/00* (2006.01)
*G06F 17/50* (2006.01)
*G06F 15/173* (2006.01)
(52) U.S. Cl. .......................... 705/34; 705/29; 709/223
(58) Field of Classification Search ................ 705/34
See application file for complete search history.

(56) References Cited

U.S. PATENT DOCUMENTS

| | | | |
|---|---|---|---|
| 5,974,127 A * | 10/1999 | Wernli et al. ........... | 379/201.01 |
| 6,308,164 B1 * | 10/2001 | Nummelin et al. ............ | 705/9 |
| 6,339,767 B1 * | 1/2002 | Rivette et al. .................. | 707/2 |
| 2003/0065681 A1 * | 4/2003 | Houston et al. ............ | 707/200 |
| 2003/0120372 A1 * | 6/2003 | Ruth et al. .................. | 700/108 |
| 2003/0172008 A1 * | 9/2003 | Hage et al. ..................... | 705/28 |
| 2003/0187800 A1 | 10/2003 | Moore et al. | |
| 2004/0167853 A1 | 8/2004 | Sharma | |
| 2005/0049903 A1 * | 3/2005 | Raja .............................. | 705/7 |
| 2005/0125522 A1 * | 6/2005 | DelGaudio et al. .......... | 709/223 |

* cited by examiner

*Primary Examiner*—F. Ryan Zeender
*Assistant Examiner*—Paul Danneman
(74) *Attorney, Agent, or Firm*—Anna Linne; Hoffman Warnick LLC

(57) ABSTRACT

The present invention provides a method, system, and computer program product for demographic reporting of billable project activity. A method in accordance with an embodiment of the present invention includes: capturing all billable project activity data associated with an information technology (IT) migration project in a database; organizing the billable project activity data into a plurality of billable project activity reports, based on selected demographic criteria; and selecting and displaying a billable project activity report in a user interface (UI).

14 Claims, 8 Drawing Sheets

METHOD, SYSTEM, AND PROGRAM PRODUCT FOR DEMOGRAPHIC REPORTING OF BILLABLE PROJECT ACTIVITY

BACKGROUND OF THE INVENTION

1. Field of the Invention

The present invention generally relates to computerized billing systems. More particularly, the present invention provides a method, system, and computer program product for demographic reporting of billable project activity.

2. Related Art

In information technology (IT), a "migration" is a change from one hardware and/or software technology to another. A migration may be performed for various reasons, and typically includes one or more hardware/software components being migrated (e.g., installed, removed, replaced, upgraded, patched, etc.) on one or more targets (e.g., computers, workstations, printers, etc.). One example of a migration is the conversion of a network from token ring to Ethernet.

For large scale/high cost projects (e.g., the migration of thousands of computers/workstations/printers from a token ring network to an Ethernet network), the amount of billing data associated with the project can be overwhelming. It would be advantageous, therefore, for individuals involved in such projects (e.g., project manager, customer, etc.) to be able to view specific details of precisely what has or will be billed at any given time.

SUMMARY OF THE INVENTION

In general, the present invention provides a method, system, and computer program product for demographic reporting of billable project activity.

A first aspect of the present invention is directed to a method for demographic reporting of billable project activity, comprising: capturing all billable project activity data associated with an information technology (IT) migration project in a database; organizing the billable project activity data into a plurality of billable project activity reports, based on selected demographic criteria; and selecting and displaying a billable project activity report in a user interface (UI).

A second aspect of the present invention is directed to a system for demographic reporting of billable project activity, comprising: a system for capturing all billable project activity data associated with an information technology (IT) migration project in a database; a system for organizing the billable project activity data into a plurality of billable project activity reports, based on selected demographic criteria; and a system for selecting and displaying a billable project activity report in a user interface (UI).

A third aspect of the present invention is directed to a program product stored on a computer readable medium for demographic reporting of billable project activity, the computer readable medium comprising program code for performing the following steps: capturing all billable project activity data associated with an information technology (IT) migration project in a database; organizing the billable project activity data into a plurality of billable project activity reports, based on selected demographic criteria; and selecting and displaying a billable project activity report in a user interface (UI).

A fourth aspect of the present invention provides a method for deploying an application for demographic reporting of billable project activity, comprising: providing a computer infrastructure being operable to: capture all billable project activity data associated with an information technology (IT) migration project in a database; organize the billable project activity data into a plurality of billable project activity reports, based on selected demographic criteria; and select and display a billable project activity report in a user interface (UI).

A fifth aspect of the present invention provides computer software embodied in a propagated signal for demographic reporting of billable project activity, the computer software comprising instructions to cause a computer system to perform the following functions: capture all billable project activity data associated with an information technology (IT) migration project in a database; organize the billable project activity data into a plurality of billable project activity reports, based on selected demographic criteria; and select and display a billable project activity report in a user interface (UI).

BRIEF DESCRIPTION OF THE DRAWINGS

These and other features of this invention will be more readily understood from the following detailed description of the various aspects of the invention taken in conjunction with the accompanying drawings in which:

FIGS. 2-7 depict an illustrative navigation of a user in a user interface provided in accordance with an embodiment of the present invention.

Figure 1:
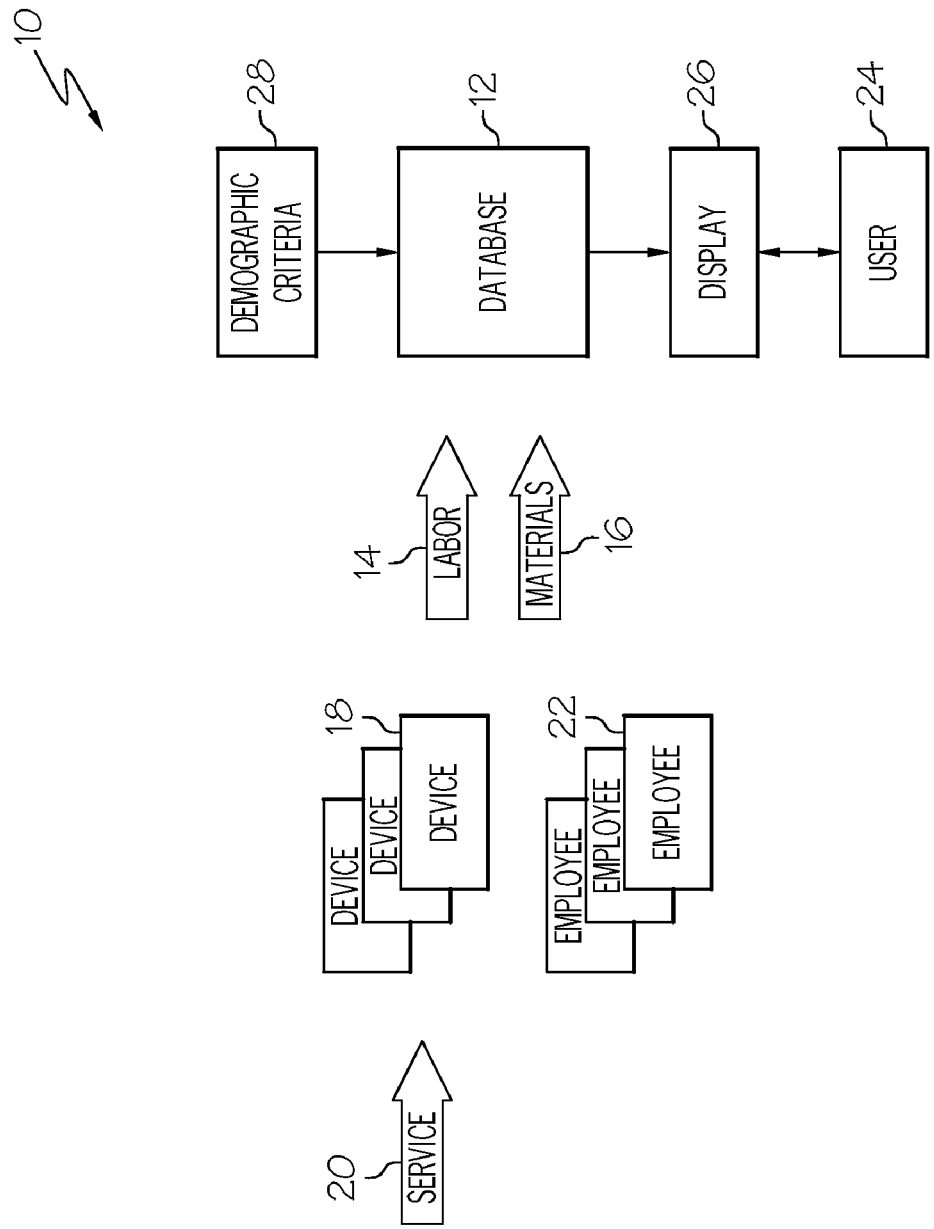
FIG. 1 depicts a system for demographic reporting of billable project activity in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for demographic reporting of billable project activity.

A system 10 for demographic reporting of billable project activity in accordance with an embodiment of the present invention is depicted in FIG. 1. In this example, the billable project activity corresponds to the labor and materials required for an IT migration project in which a network of a company is being migrated from token ring to Ethernet. However, it will be apparent to those skilled in the art that the present invention can be used to provide demographic reporting of billable project activity for any number of different projects/services.

System 10 includes a database 12 for storing billable project activity data corresponding to the labor 14 and materials 16 required for the IT migration project. For example, records are created/updated in database 12 for each device 18 (e.g., computer, peripheral, etc.) that is to receive or has received a migration-related service 20 and each employee 22 of the company (e.g., owner or user of a device) affected by the IT migration project. Other information regarding the IT migration project can also be stored in database 12. As such, all of the information regarding the labor 14 and materials 16 used in or required to execute the IT migration project is captured in database 12. Billable project activity data stored in database 12 can be displayed to a user 24 (e.g., a member of the IT migration team) on display 26 using a plurality of user interfaces. The billable project activity data can be organized based on demographic criteria 28 to provide a wide variety of reports to user 24.

The service 20 may include, for example, removing old network adapters, installing new network adapters, removing/installing/updating drivers, providing and installing new network cables, etc. The record corresponding to each device 18 may include, for example, a device identifier such as a serial number, the name or employee number of the employee associated with the device 18, the system/software configuration of the device 18, the usage of the device 18, etc. The record corresponding to each employee 22 may include, for example, the employee's name, employee number, division, department name, etc. Such employee information can be used to determine who should be billed and at what level (e.g., department, division, etc.) for a service 20 performed on a device 18.

When a service 20 is performed on a device 18, the record corresponding to the device 18 stored in database 12 is updated to reflect, for example:

(A) The materials 16 (e.g., network adapters, cables, specialized connectors, etc.) and/or labor 14 (e.g., actual or planned time for performing the service 20, identity of the technician that performed the service 20, etc.) provided;
(B) The completion status of the service 20 (e.g., completed/pending);
(C) The date of the service 20 (e.g., service date, completion date, etc.);
(D) The billing status for the service 20 (e.g., billed/not billed); and
(E) The level of billing (e.g., bill to department, division, etc.).

Other information relevant to the IT migration project can also be stored in database 12.

The present invention provides a plurality of user interfaces for displaying billable project activity associated with the IT migration project to a user 24 in an on-demand fashion. An illustrative user interface (UI) 30 provided in accordance with the present invention is displayed in FIG. 2. In this example, UI 30 allows a user 24 to view costs related to an IT migration project organized according to specified demographic criteria 28. The current view shown in UI 30 displays, for example, the cost for adapters organized by Division/Usage/Department.

In the present example, UI 30 is organized into two panes: a data selection pane 32 and a data viewing pane 34. It will be apparent to those skilled in the art, however, that many different UI techniques can be used to organize/present/display data, reports, etc., in accordance with the present invention. Accordingly, the dual pane technique described herein is not intended to be limiting in any way.

Figure 2:
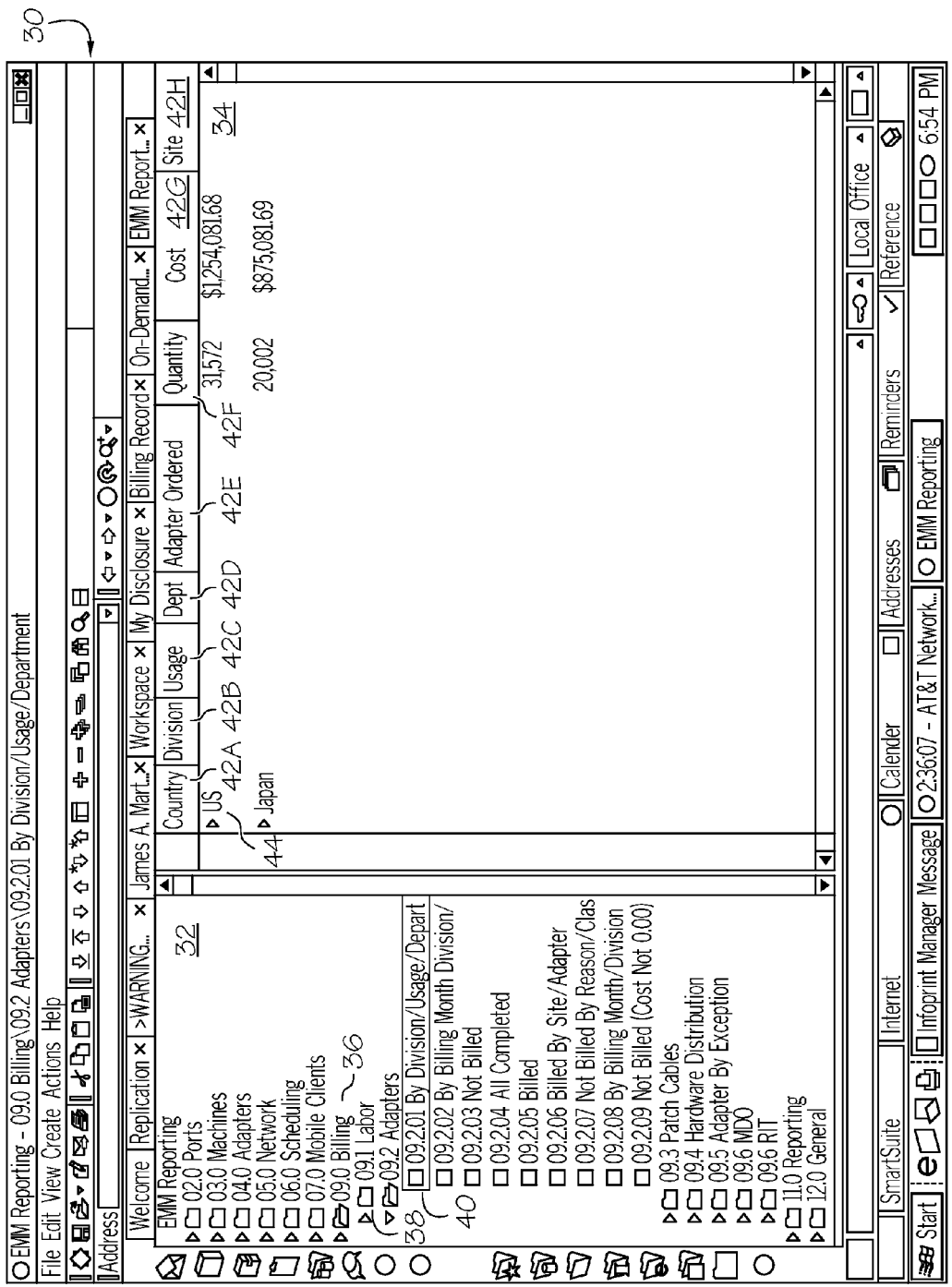

As shown in FIG. 2, in the data selection pane 32, billable project activity data is organized in a hierarchical manner in a folder 36 labeled "09.0 Billing." In this example, the "09.0 Billing" folder 36 contains a plurality of folders 38:

(A) 09.1 "Labor";
(B) 09.2 "Adapters";
(C) 09.3 "Patch Cables";
(D) 09.4 "Hardware Distribution";
(E) 09.5 "Adapter By Exception";
(F) 09.6 "MDO"; and
(G) 09.6 "RIT."

It should be noted that billable project activity could also be provided within other folders displayed in the data navigation pane. In addition, the "09.0 Billing" folder 36 could contain a plurality of other folders 38 not listed above, and/or a different set of folders 38.

As shown in FIG. 2, the 09.2 "Adapter" folder 38 contains a plurality of billable project activity reports 40 generated using the billable project activity data stored in database 12, organized according to different demographic criteria 28. In this example, the billable project activity reports 40 comprise:

(A) 09.2.01 "By Division/Usage/Department";
(B) 09.2.02 "By Billing Month/Division/Department";
(C) 09.2.03 "Not Billed";
(D) 09.2.04 "All Completed";
(E) 09.2.05 "Billed";
(F) 09.2.06 "Billed by Site/Adapter";
(G) 09.2.07 "Not Billed By Reason/Class";
(H) 09.2.08 "By Billing Month/Division"; and
(I) 09.2.09 "Not Billed (Cost Not 0.00)."

Many other types of billable project activity reports 40 could also be provided in accordance with the present invention, based on user needs and/or other factors. Also, billable project activity reports 40 could also be provided within other folders displayed in the data navigation pane 32. The data presented in each billable project activity report 40 is generally organized in a hierarchical fashion.

In the example depicted in FIG. 2, a billable project activity report 40 presenting the costs for adapters organized "By Division/Usage/Department" has been selected in the data selection pane 32 and is displayed in the data viewing pane 34 of the UI 30. As shown in the data viewing pane 34, the selected billable project activity report 40 is organized into a plurality of columns 42A-H, including: "Country" 42A, "Division" 42B, "Usage" 42C, "Dept" 42D, "Adapter Ordered" 42E, "Quantity" 42F, "Cost" 42G, and "Site" 42H. In its unexpanded state (FIG. 2), the selected billable project activity report 40 displayed in the data viewing pane 34 shows that that a total of 31,572 adapters, costing a total of $1,254,081.68, were/will be ordered in the US for the IT migration project, while a total of 20,002 adapters, costing a total of $875,081.69, were/will be ordered in Japan.

The specific types, number, and arrangement of columns displayed in the data viewing pane 34 may be different for each billable project activity report 40 selected in the data selection pane 32. For example, when the billable project activity report 40 09.2.02 "By Billing Month/Division/Department" is selected, the following arrangement of columns could be provided in the data viewing pane 34: "Country," "Billing Month," "Division," "Department," "Adapter Ordered," "Quantity," and "Cost." As another example, selection of a billable project activity report 40 in the 09.1 "Labor" folder 38 could result in the display of the following arrangement of columns in the data viewing pane 34: "Country," "Billing Month," "Division," "Department," "Technician," and "Total Labor."

Figure 3:
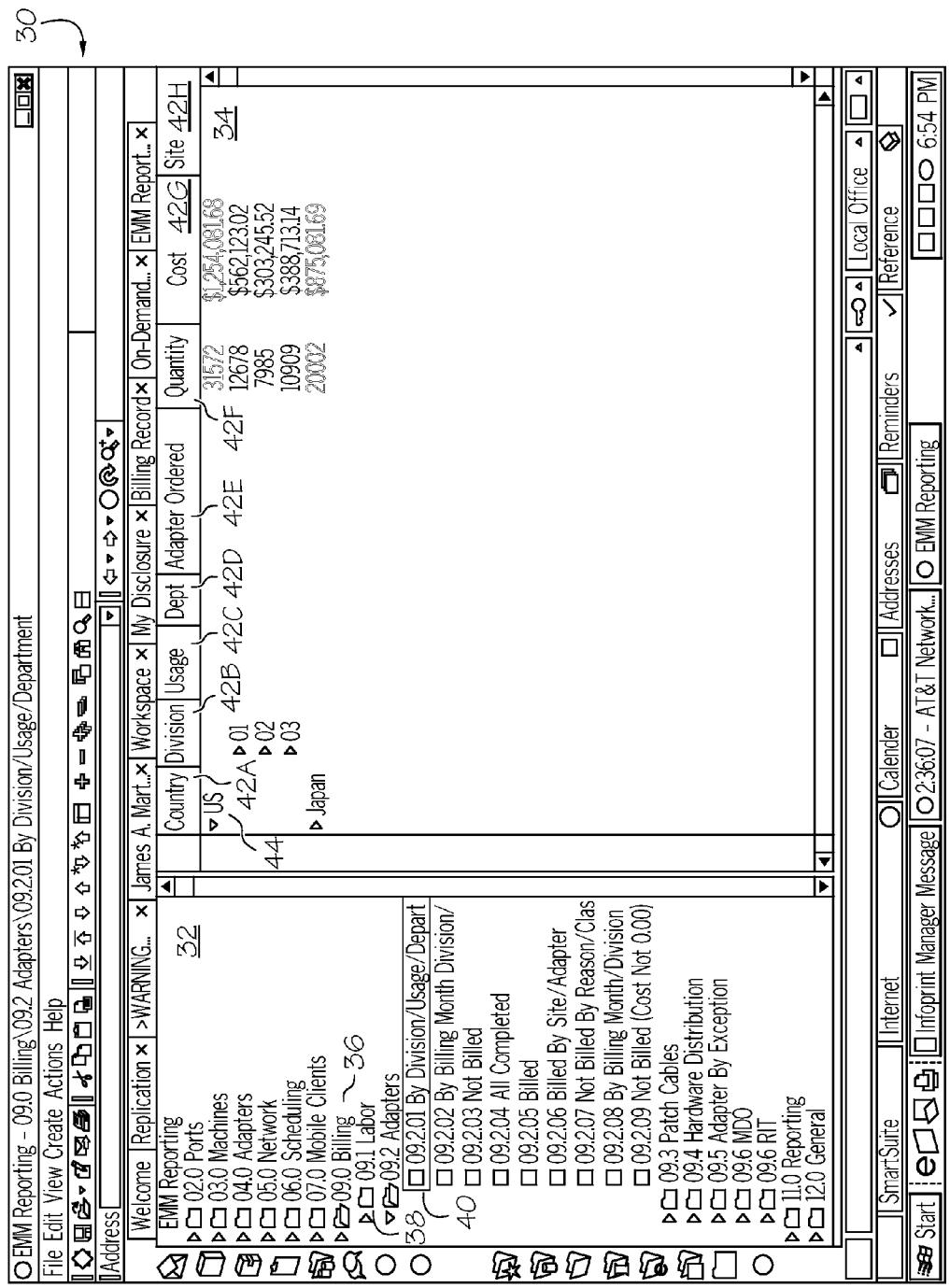

When the entry for the US in the "Country" column 42A of the data viewing pane 34 is expanded, the selected billable project activity report 40 appears as depicted in FIG. 3. An entry in the selected billable project activity report 40 can be expanded/contracted in a known manner via a drop-down arrow 44 or other suitable technique. As shown in the data viewing pane 34, the selected billable project activity report 40 now additionally displays the total quantity of adapters and their total cost for the US, split up according to Division (i.e., "01," "02," and "03" in the "Division" column 42B).

Figure 4:
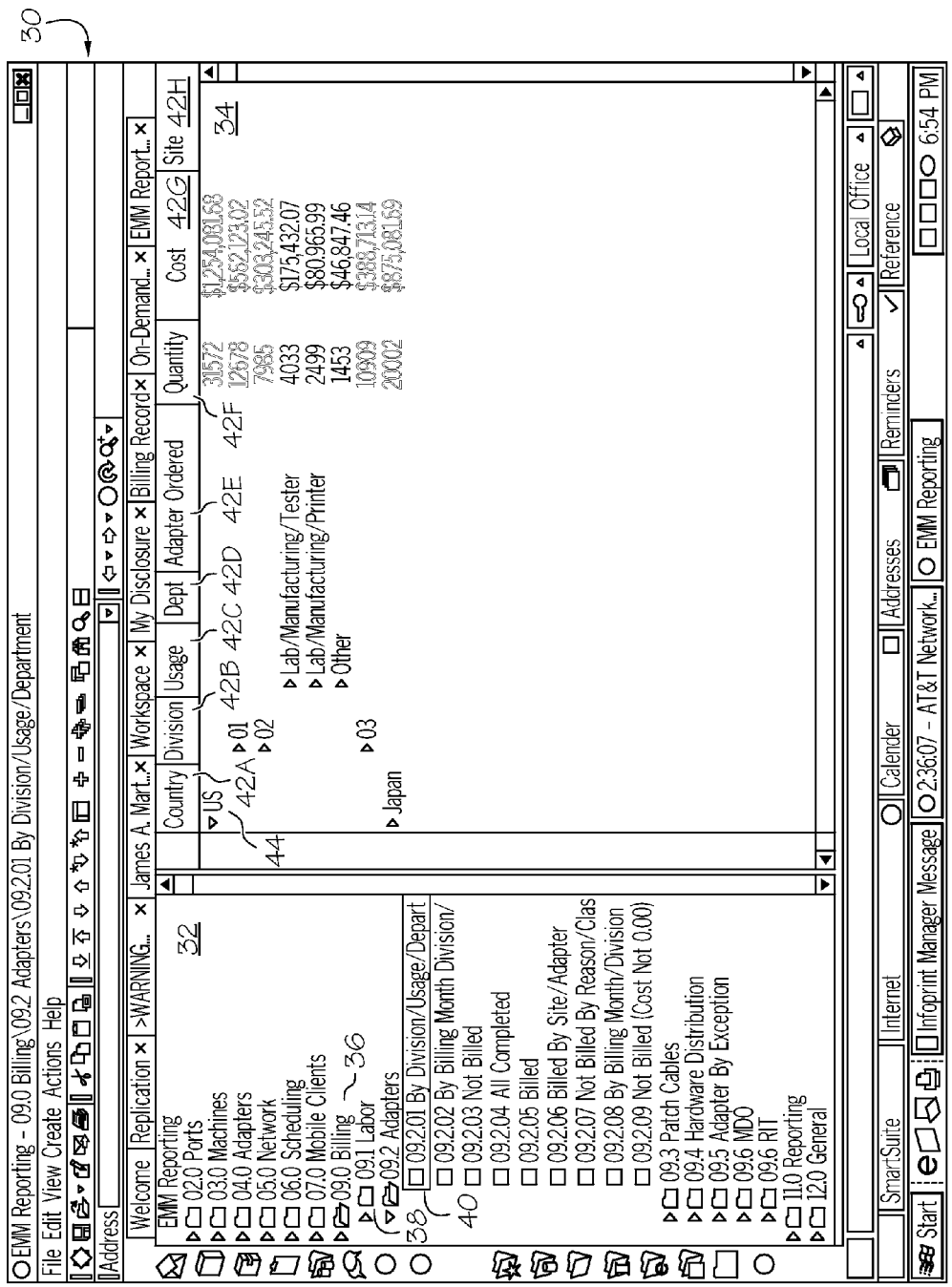

When the entry for Division "02" in the "Division" column 42B is expanded, the selected billable project activity report 40 appears as depicted in FIG. 4. As shown in the data viewing pane 34, the selected billable project activity report 40 now displays the total quantity of adapters and their total cost for Division "02," split up according to Usage (i.e., "Lab/Manufacturing/Tester," "Lab/Manufacturing/Printer," "Other" in the "Usage" column 42C). Thus, the total quantity and cost of adapters for the US and Japan, for each Division in the US, and for each Usage in Division "02" in the US is now displayed in the data viewing pane 34.

Figure 5:
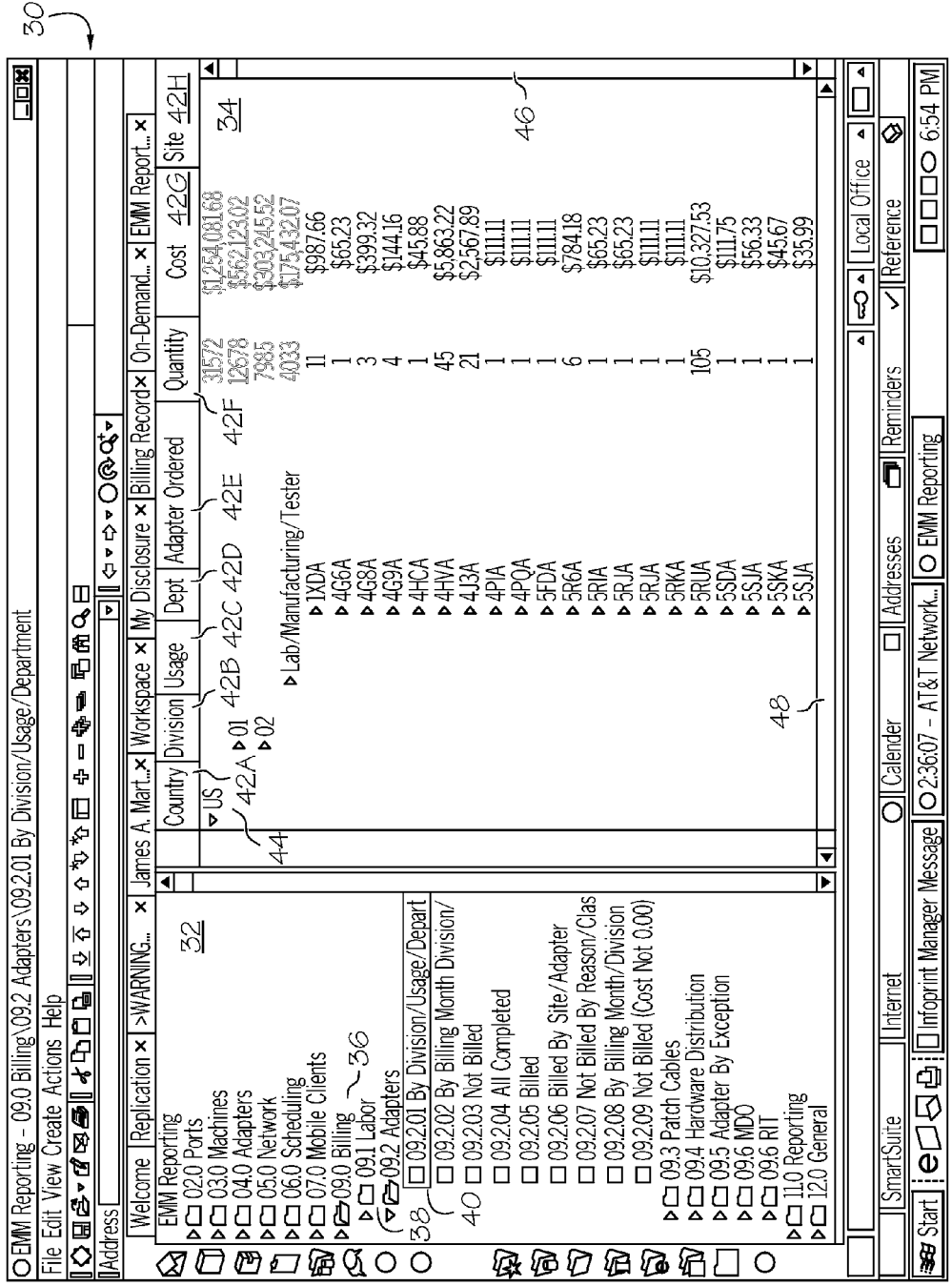

When the entry for Usage "Lab/Manufacturing/Tester" in the "Usage" column 42C is expanded, the selected billable project activity report 40 appears as depicted in FIG. 5. It should be noted that some of the information displayed in the data viewing pane 34 in FIG. 4 does not appear in the view shown in FIG. 5. However, the view can be adjusted in a manner known in the art using vertical and/or horizontal scroll bars 46, 48, or other suitable scrolling/panning mechanism. As shown in the data viewing pane 34, the selected billable project activity report 40 now displays the total quantity of adapters and their total cost for Usage "Lab/Manufacturing/Tester" split up by Department (i.e., "1XDA," "4G6A," "4G8A," "4G9A," etc. in the "Dept" column 42D). Thus, the total quantity and cost of adapters for the US and Japan, for each Division in the US, for each Usage in Division "02" in the US, and for each Department within Usage "Lab/Manufacturing/Tester" in Division "02" in the US is now displayed in the data viewing pane 34.

Figure 6:
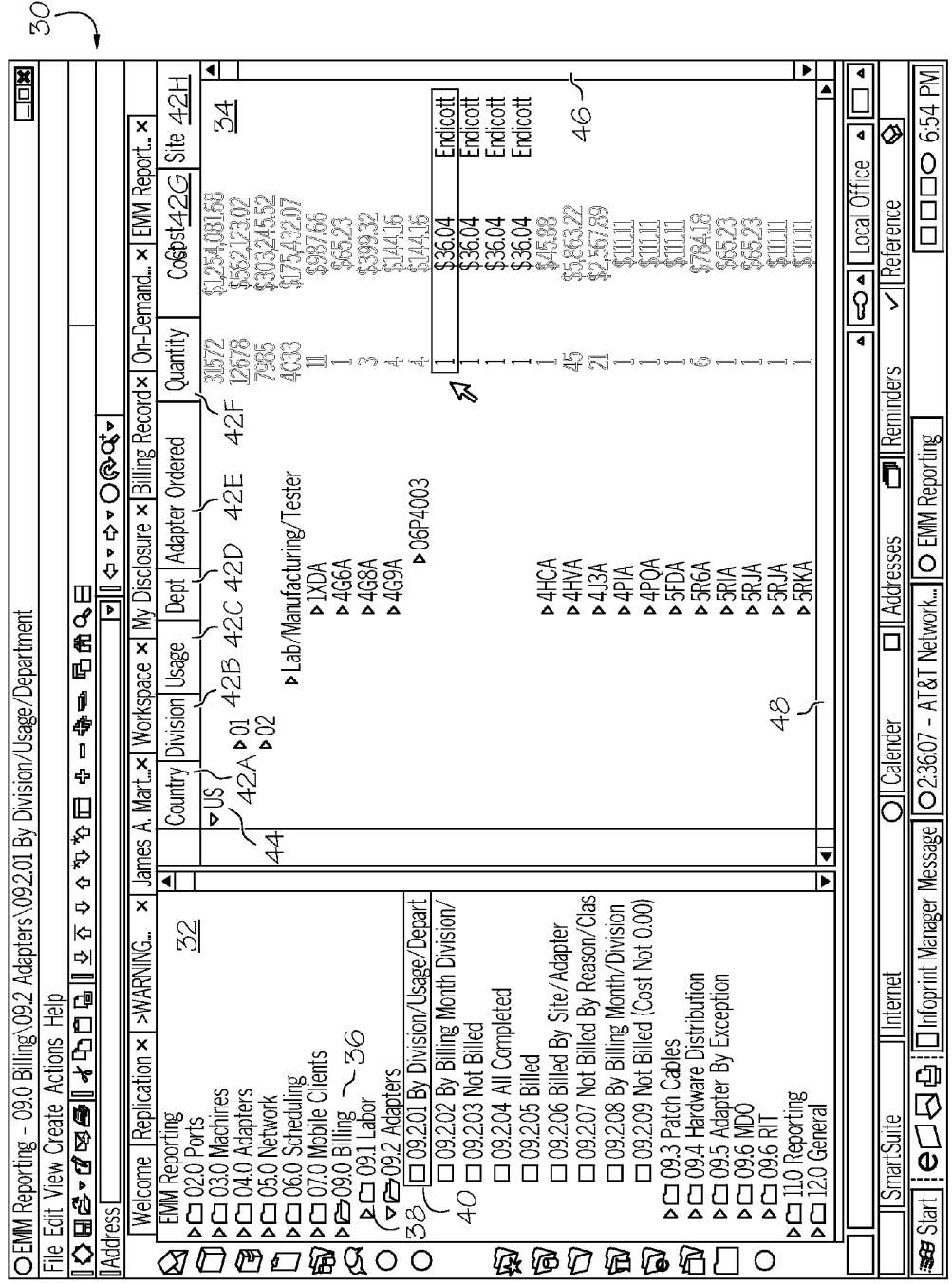

When the entry for Department "4G9A" in the "Dept" column 42D shown in FIG. 5 is expanded, and the entry for Adapter "06P4003" in the "Adapter Ordered" column 42E is subsequently expanded, the selected billable project activity report 40 appears as depicted in FIG. 6. At this point in the navigation, the cost of an individual adapter of type "06P4003" is now displayed in the "Cost" column 42G.

Comparing the various views provided in FIGS. 2-6, it can be seen that the present invention is capable of quickly and easily providing a tremendous amount of billable project activity data, organized (e.g., in billable project activity reports 40) according to a wide variety of demographic criteria, in an on-demand fashion. For example, a user can easily and quickly determine the costs associated with adapters that have not yet been billed (e.g., in the billable project activity report 09.2.03 "Not Billed") or the costs associated with adapters that have been billed (e.g., in the billable project activity report 09.2.05 "Billed"), by examining the corresponding billable project activity reports 40. As another example, the reasons why costs have not been billed for particular adapters can be organized and displayed, for example, in the billable project activity report 09.2.07 "Not Billed By Reason/Class." Such reasons could include, for example, missing data, incorrect data, etc., in associated records stored in database 12. Thus, the billable project activity reports 40 can be used before a billing event, for example, to ensure complete and accurate billing, and after the billing event, for example, for reporting or accounting, or to determine recovered costs. Many other uses for the billable project activity reports 40 are also possible.

The present invention allows the costs for materials 16 (e.g., adapters, patch cables, etc.) and labor 14 to be rolled-up according to various demographic criteria 28. For example, billable project activity reports 40 can be provided that display the total billed costs by Division, Department, month, etc. Other billable project activity reports 40 can be provided to the IT team performing/managing the migration project that display the costs that have been recovered for the project by month, technician, etc. Many other types of billable project activity reports 40 are also possible.

Figure 7:
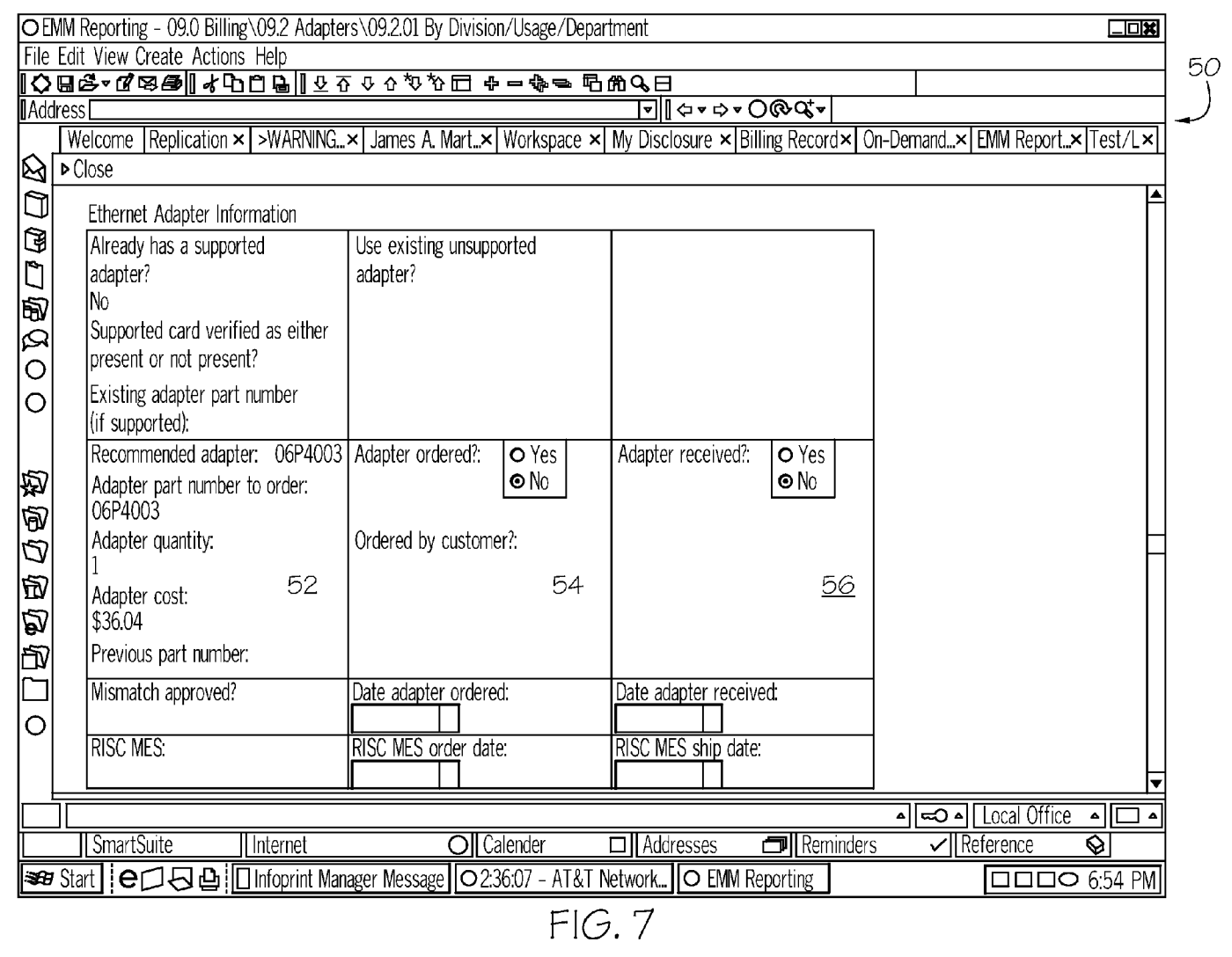

When an entry under Adapter "06P4003" is selected as shown in FIG. 6, the data in one or more record(s) in database 12 (FIG. 1) associated with that adapter is extracted and displayed to the user. This data can include, for example, information regarding the adapter, the device in which the adapter has been to or will be installed (e.g., type of device, manufacturer, serial number, operating system, location, owner, etc.), the owner of the device (e.g., employee name, employee number, manager, location, phone number, email address, etc.), network information (e.g., network port connection, TCP/IP address), as well as other pertinent information. An illustrative portion 50 of this data is depicted in FIG. 7. As shown, portion 50 includes information 52 such as adapter quantity and cost, information 54 regarding the ordering status of the adapter, and information 56 regarding the received status of the adapter, after it has been ordered.

Figure 8:
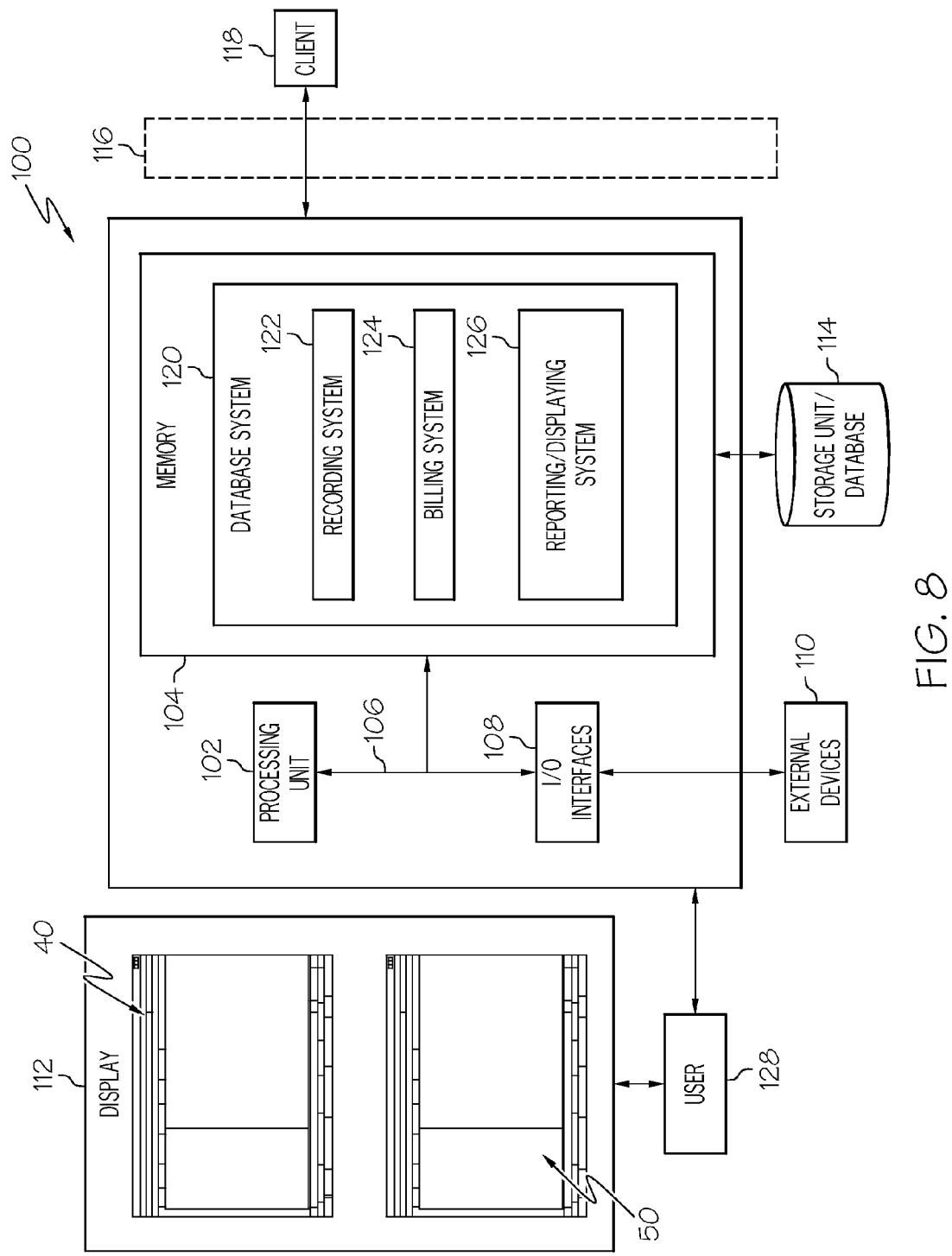
FIG. 8 depicts a computer system for implementing an embodiment of the present invention.

A computer system 100 for implementing an embodiment of the present invention is illustrated in FIG. 8. As shown, computer system 100 generally includes a processing unit 102, memory 104, bus 106, input/output (I/O) interface(s) 108, external devices/resource(s) 110, and storage unit 112. Processing unit 102 may comprise a single processing unit, or may be distributed across one or more processing units in one or more locations. Memory 104 may comprise any known type of data storage and/or transmission media, including magnetic media, optical media, random access memory (RAM), read-only memory (ROM), etc. Moreover, similar to processing unit 102, memory 104 may reside at a single physical location, comprising one or more types of data storage, or be distributed across a plurality of physical systems in various forms.

I/O interface(s) 108 may comprise any system for exchanging information to/from an external source. External devices/resource(s) 110 may comprise any known type of external device, including speakers, a CRT, LED screen, handheld device, keyboard, mouse, voice recognition system, speech output system, printer, monitor/display (e.g., display 112), facsimile, pager, etc.

Bus 106 provides a communication link between each of the components in computer system 100, and likewise may comprise any known type of transmission link, including electrical, optical, wireless, etc. In addition, although not shown, additional components, such as cache memory, communication systems, system software, etc., may be incorporated into computer system 100.

Data (e.g., labor data, materials data, employee data, billable project activity data, billable project activity reports 40, demographic criteria 28, etc.) used in the practice of the present invention can be stored locally to computer system 100, for example, in storage unit/database 114, and/or may be provided to computer system 100 over a network 116. Storage unit/database 114 can be any system capable of providing storage for data and information under the present invention. As such, storage unit/database 114 may reside at a single physical location, comprising one or more types of data storage, or may be distributed across a plurality of physical systems in various forms. In another embodiment, storage unit/database 114 may be distributed across, for example, a local area network (LAN), wide area network (WAN) or a storage area network (SAN) (not shown).

Network 116 is intended to represent any type of network over which data can be transmitted. For example, network 116 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server. One or more client devices 118 may be connected to computer system 100 via network 116. Each client device 118 comprises components similar to those described above with regard to computer system 100.

Shown in memory 104 as a computer program product is a database system 120. Database system 120 includes a recording system 122 for providing/updating records in storage unit/database 114 (e.g., based on data entered by a user, administrator, technician, etc.), a billing system 124 for generating billable project activity data, and a reporting/displaying system 126 for generating/displaying billable project activity reports 40 and other data (e.g., data portion 50) to a user 128 in accordance with the present invention.

It should be appreciated that the teachings of the present invention can be offered as a business method on a subscription or fee basis. For example, one or more components of the present invention could be created, maintained, supported, and/or deployed by a service provider that offers the functions described herein for customers. That is, a service provider could be used to provide demographic reporting of billable project activity, as describe above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A computer-implemented method for demographic reporting of billable project activity, comprising:
    capturing and storing in a database, all billable project activity data associated with an information technology (IT) migration project, wherein the billable project activity data includes records for a plurality of devices that received or will receive a migration-related service and records for a plurality of employees affected by the migration-related service, the records including device and employee identifiers;
    where the records reflect migration-related service that will be received, updating the records in the database after the migration-related service is complete;
    using a processor operably connected to the database to hierarchically organize the billable project activity data into a plurality of billable project activity reports, based on selected demographic criteria;
    generating and providing a billable project activity report for display in a user interface (UI), wherein the UI comprises a data navigation pane for selecting a billable project activity report to be displayed and a data viewing pane for displaying and navigating through the selected billable project activity report; and
    navigating through the billable project activity report to determine costs associated with a selected level of the billable project activity report,
    wherein the costs associated with the selected level of the billable project activity report are equal to a sum of the costs at a next lower level of the billable project activity report,
    wherein costs in a billable project activity report are rolled up based on the selected demographic criteria, such that the rolled up costs are displayed in the data viewing pane when an appropriate demographic criteria is selected, and
    wherein at least one of the billable project activity reports provides information regarding why specific costs to be billed have not yet been billed.

2. The method of claim 1, wherein the IT migration project comprises a migration from a first type of network to a second type of network.

3. The method of claim 1, wherein the billable project activity data includes information regarding labor and materials associated with the IT migration project.

4. The method of claim 3, wherein the information comprises at least one of a quantity and cost of the labor and materials.

5. The method of claim 1, wherein at least one of the billable project activity reports provides costs associated with unbilled materials or unbilled labor.

6. The method of claim 1, wherein at least one of the billable project activity reports provides costs associated with billed materials or billed labor.

7. Deploying an application for demographic reporting of billable project activity, comprising:
    providing a computer infrastructure being operable to perform the method of claim 1.

8. A computer-implemented system for demographic reporting of billable project activity, comprising:
    at least one processing unit;
    a memory operably associated with the at least one processing unit; and
    a database system storable in memory and executable by the at least one processing unit, the database system comprising:
        a system configured for capturing all billable project activity data associated with an information technology (IT) migration project in a database, wherein the billable project activity data includes records for a plurality of devices that received or will receive a migration-related service and records for a plurality of employees affected by the migration-related service, the records including device and employee identifiers;

a system configured for, where the records reflect migration-related service that will be received, updating the records in the database after the migration-related service is complete;

a system configured for hierarchically organizing the billable project activity data into a plurality of billable project activity reports, based on selected demographic criteria;

a system configured for selecting and displaying a billable project activity report in a user interface (UI), wherein the UI comprises a data navigation pane for selecting a billable project activity report to be displayed and a data viewing pane for displaying and navigating through the selected billable project activity report; and a system configured for navigating through the billable project activity report to determine costs associated with a selected level of the billable project activity report, wherein the costs associated with the selected level of the billable project activity report are equal to a sum of the costs at a next lower level of the billable project activity report, wherein costs in a billable project activity report are rolled up based on the selected demographic criteria, such that the rolled up costs are displayed in the data viewing pane when an appropriate demographic criteria is selected, and wherein at least one of the billable project activity reports provides information regarding why specific costs to be billed have not yet been billed.

9. The system of claim 8, wherein the IT migration project comprises a migration from a first type of network to a second type of network.

10. The system of claim 8, wherein the billable project activity data includes information regarding labor and materials associated with the IT migration project.

11. The system of claim 10, wherein the information comprises at least one of a quantity and cost of the labor and materials.

12. The system of claim 8, wherein at least one of the billable project activity reports provides costs associated with unbilled materials or unbilled labor.

13. The system of claim 8, wherein at least one of the billable project activity reports provides costs associated with billed materials or billed labor.

14. A computer readable storage medium storing computer instructions which when executed, cause a computer system to report billable project activity, the computer instructions comprising:

capturing and storing in a database all billable project activity data associated with an information technology (IT) migration project in a database, wherein the billable project activity data includes records for a plurality of devices that received or will receive a migration-related service and records for a plurality of employees affected by the migration-related service, the records including device and employee identifiers;

where the records reflect migration-related service that will be received, updating the records in the database after the migration-related service is complete;

using a processor operably connected to the database to hierarchically organize the billable project activity data into a plurality of billable project activity reports, based on selected demographic criteria;

selecting and displaying on a display a billable project activity report in a user interface (UI), wherein the UI comprises a data navigation pane for selecting a billable project activity report to be displayed and a data viewing pane for displaying and navigating through the selected billable project activity report; and navigating through the billable project activity report to determine costs associated with a selected level of the billable project activity report, wherein the costs associated with the selected level of the billable project activity report are equal to a sum of the costs at a next lower level of the billable project activity report, wherein costs in a billable project activity report are rolled up based on the selected demographic criteria, such that the rolled up costs are displayed in the data viewing pane when an appropriate demographic criteria is selected, and wherein at least one of the billable project activity reports provides information regarding why specific costs to be billed have not yet been billed.

* * * * *